(12) United States Patent
Vetro et al.

(10) Patent No.: US 6,493,386 B1
(45) Date of Patent: Dec. 10, 2002

(54) OBJECT BASED BITSTREAM TRANSCODER

(75) Inventors: Anthony Vetro, Staten Island, NY (US); Huifang Sun, Cranbury, NJ (US); Yao Wang, Matawan, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 09/504,323

(22) Filed: Feb. 14, 2000

Related U.S. Application Data

(63) Continuation-in-part of application No. 09/496,706, filed on Feb. 2, 2000.

(51) Int. Cl.[7] .............................. H04N 7/26; H04N 7/52
(52) U.S. Cl. ...................... 375/240.1; 382/243; 375/12
(58) Field of Search ................... 375/240.12, 240.1, 375/240.08; 382/243

(56) References Cited

U.S. PATENT DOCUMENTS

| | | | | |
|---|---|---|---|---|
| 4,464,783 A | * | 8/1884 | Beraud et al. | 375/240 |
| 4,074,074 A | * | 2/1978 | Boutmy et al. | 370/537 |
| 6,400,846 B1 | * | 6/2002 | Lin et al. | 375/240.12 |

* cited by examiner

*Primary Examiner*—Howard Britton
(74) *Attorney, Agent, or Firm*—Dirk Brinkman

(57) ABSTRACT

A compressed bitstream is scaled down to a reduced rate bitstream by first demultiplexing a compressed input bitstream to extract video objects as elementary input bitstreams having a first bit rate. A transcoder converts each elementary input bitstream to an elementary output bitstream having a second bit rate. The first bit rate is less than the second bit rate. A transcoding control unit, coupled to the transcoder, supplies control information for the transcoder. A multiplexer composes the elementary output bitstreams into a compressed output bitstream having the second bit rate.

31 Claims, 7 Drawing Sheets

OBJECT BASED BITSTREAM TRANSCODER

CROSS-REFERENCE TO RELATED APPLICATION

This is a Continuation-in Part Application of U.S. Patent Application of U.S. patent application Ser. No. 09/496,706, "Adaptable Compressed Bitstream Transcoder" filed," filed on Feb. 2, 2000 by Vetro et al.

FIELD OF THE INVENTION

This invention relates generally to information delivery systems, and more particularly to delivery systems that adapt information encoded as object-based compressed bitstreams to available bit rates of a network.

BACKGROUND OF THE INVENTION

Recently, a number of standards have been developed for communicating encoded information. For video sequences, the most widely used standards include MPEG-1 (for storage and retrieval of moving pictures), MPEG-2 (for digital television) and H.263, see ISO/IEC JTC1 CD 11172, MPEG, "Information Technology—Coding of Moving Pictures and Associated Audio for Digital Storage Media up to about 1.5 Mbit/s—Part 2: Coding of Moving Pictures Information," 1991, LeGall, "MPEG: A Video Compression Standard for Multimedia Applications," Communications of the ACM, Vol. 34, No. 4, pp. 46–58, 1991, ISO/IEC DIS 13818-2, MPEG-2, "Information Technology—Generic Coding of Moving Pictures and Associated Audio Information—Part 2: Video," 1994, ITU-T SG XV, DRAFT H.263, "Video Coding for Low Bitrate Communication," 1996, ITU-T SG XVI, DRAFT13 H.263+Q15-A-60 rev.0, "Video Coding for Low Bitrate Communication," 1997.

These standards are relatively low-level specifications that primarily deal with the spatial and temporal compression of video sequences. As a common feature, these standards perform compression on a per frame basis. With these standards, one can achieve high compression ratios for a wide range of applications.

Newer video coding standards, such as MPEG-4 (for multimedia applications), see "Information Technology—Generic coding of audio/visual objects," ISO/IEC FDIS 14496-2 (MPEG4 Visual), Nov. 1998, allow arbitrary-shaped objects to be encoded and decoded as separate video object planes (VOP). The objects can be visual, audio, natural, synthetic, primitive, compound, or combinations thereof. Video objects are composed to form compound objects or "scenes."

The emerging MPEG-4 standard is intended to enable multimedia applications, such as interactive video, where natural and synthetic materials are integrated, and where access is universal. MPEG-4 allows for content based interactivity. For example, one might want to "cut-and-paste" a moving figure or object from one video to another. In this type of application, it is assumed that the objects in the multimedia content have been identified through some type of segmentation process, see for example, U.S. Pat. No. 6,400,846"Method for Ordering Image Spaces to Search for Object Surfaces" filed on Jun. 4, 1999 by Lin et al.

In the context of video transmission, these compression standards are needed to reduce the amount of bandwidth (available bit rate) that is required by the network. The network may represent a wireless channel or the Internet. In any case, the network has limited capacity and a contention for its resources must be resolved when the content needs to be transmitted.

Over the years, a great deal of effort has been placed on architectures and processes that enable devices to transmit the content robustly and to adapt the quality of the content to the available network resources. When the content has already been encoded, it is sometimes necessary to further convert the already compressed bitstream before the stream is transmitted through the network to accommodate, for example, a reduction in the available bit rate.

Bit stream conversion or "transcoding" can be classified as bit rate conversion, resolution conversion, and syntax conversion. Bit rate conversion includes bit rate scaling and conversion between a constant bit rate (CBR) and a variable bit rate (VBR). The basic function of bit rate scaling is to accept an input bitstream and produce a scaled output bitstream which meets new load constraints of a receiver. A bit stream scaler is a transcoder, or filter, that provides a match between a source bitstream and the receiving load.

As shown in FIG. 1, typically, scaling can be accomplished by a transcoder 100. In a brute force case, the transcoder includes a decoder 110 and encoder 120. A compressed input bitstream 101 is fully decoded at an input rate Rin, then encoded at a new output rate Rout 102 to produce the output bitstream 103. Usually, the output rate is lower than the input rate. However, in practice, full decoding and full encoding in a transcoder is not done due to the high complexity of encoding the decoded bitstream.

Earlier work on MPEG-2 transcoding has been published by Sun et al., in "Architectures for MPEG compressed bitstream scaling," IEEE Transactions on Circuits and Systems for Video Technology, Apr. 1996. There, four methods of rate reduction, with varying complexity and architecture, were presented.

FIG. 2 shows an example method. In this architecture, the video bitstream is only partially decoded. More specifically, macroblocks of the input bitstream 201 are variable-length decoded (VLD) 210. The input bitstream is also delayed 220 and inverse quantized (IQ) 230 to yield discrete cosine transform (DCT) coefficients. Given the desired output bit rate, the partially decoded data are analyzed 240 and a new set of quantizers is applied at 250 to the DCT blocks. These re-quantized blocks are then variable-length coded (VLC) 260 and a new output bitstream 203 at a lower rate can be formed. This scheme is much simpler than the scheme shown in FIG. 1 because the motion vectors are re-used and an inverse DCT operation is not needed.

More recent work by Assuncao et al., in "A frequency domain video transcoder for dynamic bit-rate reduction of MPEG-2 bitstreams," IEEE Transactions on Circuits and Systems for Video Technology, pp. 953–957, December 1998, describe a simplified architecture for the same task. They use a motion compensation (MC) loop, operating in the frequency domain for drift compensation. Approximate matrices are derived for fast computation of the MC blocks in the frequency domain. A Lagrangian optimization is used to calculate the best quantizer scales for transcoding.

Other work by Sorial et al, "Joint transcoding of multiple MPEG video bitstreams," Proceedings of the International Symposium on Circuits and Systems, May 1999, presents a method of jointly transcoding multiple MPEG-2 bitstreams, see also U.S. patent application Ser. No. 09/410, 552"Estimating Rate-Distortion Characteristics of Binary Shape Data," filed Oct. 1, 1999 by Vetro et al.

According to prior art compression standards, the number of bits allocated for encoding texture information is controlled by a quantization parameter (QP). The above papers are similar in that changing the QP based on information that is contained in the original bitstream reduces the rate of texture bits. For an efficient implementation, the information is usually extracted directly in the compressed domain and may include measures that relate to the motion of macroblocks or residual energy of DCT blocks. This type of analysis can be found in the bit allocation analyzer.

Although in some cases, the bitstream can be preprocessed, it is still important that the transcoder operates in real-time. Therefore, significant processing delays on the bitstream cannot be tolerated. For example, it would not be feasible for the transcoder to extract information from a group of frames, then transcode the content based on this look-ahead information. This would not work for live broadcasts, or video conferencing. Although it is possible to achieve better transcoding results in terms of quality due to better bit allocation, such an implementation for real-time applications is impractical.

It is also important to note that classical methods of transcoding are limited in their ability to reduce the bit rate. In other words, if only the QP of the outgoing video is changed, then there is a limit to how much one may reduce the rate. The limitation in reduction is dependent on the bitstream under consideration. Changing the QP to a maximum value will usually degrade the content of the bitstream significantly. Another alternative to reducing the spatial quality is to reduce the temporal quality, i.e., drop or skip frames. Again, skipping too many frames will also degrade the quality significantly. If both reductions are considered, then the transcoder is faced with a trade-off in spatial versus temporal quality.

This concept of such a spatio-temporal trade-off can also be considered in the encoder. However, not all video coding standards support frame skipping. For example, in MPEG-1 and MPEG-2, the Group of Picture (GOP) structure is pre-determined, i.e., the Intra frame period and distance between anchor frames is fixed. As a result, all pictures must be encoded. To get around this temporal constraint, the syntax does allow macroblocks to be skipped. If all macroblocks in a frame are skipped, then the frame has essentially been skipped. At least one bit is used for each macroblock in the frame to indicate this skipping. This can be inefficient for some bit rates.

The H.263 and MPEG-4 standards do allow frame skipping. Both standards support a syntax that allows a reference to be specified. However, their frame skipping has mainly been used to satisfy buffer constraints. In other words, if the buffer occupancy is too high and in danger of overflow, then the encoder will skip a frame to reduce the flow of bits into the buffer and give the buffer some time to send its current bits.

A more sophisticated use of this syntax allows one to make the spatio-temporal trade-offs in non-emergency situations, i.e., code more frames at a lower spatial quality, or code less frames at a higher spatial quality. Depending on the complexity of the content, either strategy can potentially lead to better overall quality. Methods to control this trade-off in an MPEG-4 object-based encoder have been described in U.S. Pat. No. 5,969,764, "Adaptive video coding method", issued on Oct. 19, 1999 to Sun et al., and in "MPEG-4 rate control for multiple video objects," IEEE Trans. on Circuits and Systems for Video Technology, February 1999, by Vetro et al. There, two modes of operation were introduced, HighMode and LowMode. Depending on a current mode of operation, which was determined by the outgoing temporal resolution, adjustments in the way bits were allocated were made.

Besides the work referenced above, methods to control this spatio-temporal trade-off have received minimal attention. Furthermore, the information that is available in the transcoder to make such decisions is quite different than that of the encoder. As a result, the transcoder must find some alternate means of transmitting the information that is contained in a bitstream to adapt to reductions in available bit rates.

SUMMARY OF THE INVENTION

It is an object of the invention to reduce the bit rate of a video bitstream without severely degrading the information that is conveyed at the reduced bit rate. Furthermore, it is an object to reduce the bit rate by individually manipulating video objects of the bitstream in a joint manner. Because this object-based scheme has this finer level of access, it enables a reduction of the level of spatio-temporal quality of one object without significantly impacting the quality of the entire bitstream.

More particularly, the invention provides a bitstream scaler and method that operates individual object of a compressed bitstream. A demultiplexer extracts each video object from a compressed input bitstream as an elementary input bitstream having a first bit rate. A transcoder converts each elementary input bitstream to an elementary output bitstream having a second bit rate. A transcoding control unit, coupled to the transcoder, generates control information for the transcoder. A multiplexer composes the elementary output bitstreams into a compressed output bitstream having the second bit rate. Typically, the second bit rate is less than the first bit rate. The scaler also includes an output buffer generating rate feedback information for the transcoding control unit. The trancoding control unit can include a shape analyzer, a texture analyzer, a temporal analyzer, and a spatial analyzer to generate the control information from object data generated by the transcoder.

DETAILED DESCRIPTION OF PREFERRED EMBODIMENTS

Introduction

Quality of Bitstream

Figure 1:
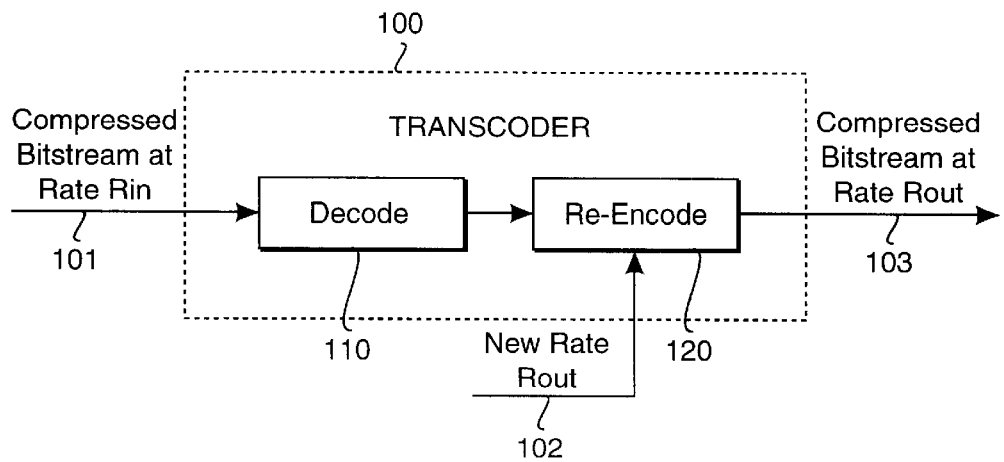
FIG. 1 is a block diagram of a prior art transcoder.
Figure 2:
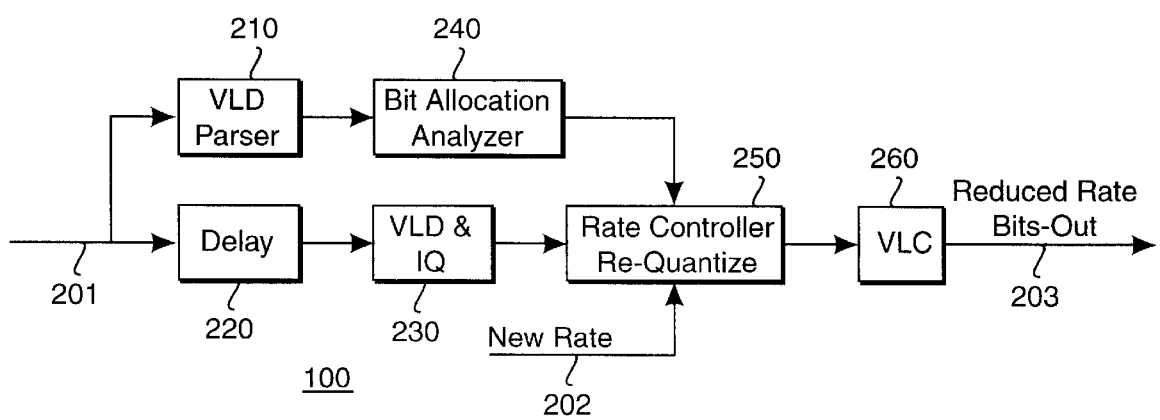
FIG. 2 is a block diagram of a prior art partial decoder/encoder.

We describe a bitstream delivery system that is capable of converting, or "scaling," a compressed input bitstream to a compressed output bitstream at a target rate, i.e., an available bit rate (ABR) of a network. Usually the target rate is less than the original rate. In other words, the task of our transcoder is to further compress the bitstream, usually due to constraints in network resources or receiver load. We describe two content-based transcoding techniques, the first at the frame level, and the second at the video object level.

Our system is capable of overcoming the drawbacks of conventional transcoders, namely limitations in rate conversion, particularly in real-time applications. Although conventional transcoding techniques may be able to sufficiently reduce the rate, the quality of the content may be severely degraded and the information that is conveyed in the reduced bit rate bitstream may be lost altogether. Conventionally, bitstream "quality" is measured as the bit-by-bit differences between the input and output bitstreams.

We describe transcoding techniques that are able to achieve the target rate while maintaining the quality of the content of the bitstream.

Continuous-Conversion

Conventional frame-based transcoding techniques can be defined as continuous-conversions. Because conventional techniques attempt to continuously maintain the best trade-off in spatial vs. temporal quality, the output is always a sequence of frames that best represents the input sequence. When a particular frame is skipped to meet constraints on the rate, the information that is contained within the skipped frame is not considered. If enough frames are skipped, then the bitstream that is received is meaningless to a user, or at best, less than satisfactory.

Quality Distortion Metrics

A conventional continuous-conversion transcoder makes optimal decisions in the rate-distortion sense with regard to the trade-offs in spatial and temporal quality. In such a transcoder, the distortion is usually taken to be any classic distortion metric, such as the peak signal to noise ratio (PSNR). It should be emphasized that in such a conversion, the distortion is not a measure of how well the content of the bitstream is being conveyed, but rather of the bit-to-bit differences between the original input bitstream and the reconstructed output bitstream, i.e., the quality.

Fidelity of Bitstream

In one embodiment for transcoding a bitstream sequence under low bit rate constraints, we summarize the content of the bitstream with a small number of frames. In this way, we do not use the classic distortion metrics focused on quality. Rather, we adopt a new measure that we call "fidelity." Fidelity takes into consideration the semantics of the content. By the semantics, we do not mean the bits or pixels, but rather humanly meaningful concepts represented by the bit, for example, words, sounds, image objects, videos, and the like.

Fidelity can be defined in a number of ways. However fidelity, as we define it, is not related to conventional quantitative quality, e.g., the bit-by-bit differences. Rather, our fidelity measures the degree to which a frame or any number of frames conveys the information contained in the original image sequence, i.e., the content or higher level meaning of the information that is conveyed, and not the raw bits.

Discrete-Summary Transcoder

Fidelity is a more subjective or semantic measure than conventional distortion metrics. However, fidelity is a useful measure to gauge the non-conventional transcoder's performance. Because the output of our transcoder according to one embodiment is a finite set of relatively high quality frames that attempt to summarize the entire sequence of bits, we refer to this type of transcoder as a "discrete-summary transcoder."

For example, at low bit rates, we choose a small number of high quality frames to represent the video. In this way, the semantic "meaning" of the bitstream is preserved.

It could be stated that this discrete-summary transcoder performs a semantic sampling of the input bitstream, whereas continuous transcoders only sample quantitatively in the spatial and temporal domains. In situations where the bit rate is severely limited, we sample "rich" frames to preserve the fidelity of the content encoded in the bitstream.

Because we selectively sample rich frames, we may lose one aspect in the bitstream-motion. Preferably, we resort to discrete-summary transcoding only when the rate-distortion performance of the continuous-conversion transcoder is severely degraded or cannot meet the target rate. Under these conditions, conventional continuous-conversion transcoders lose fluid motion because the frame rate is so low that the rate of information delivery becomes jerky and disturbing to the user.

The major gain of discrete-summary transcoding over conventional continuous-conversion transcoding is that discrete-summary transcoders attempts to choose frames that are rich in information, whereas continuous-conversion transcoders may well drop frames that are rich in information.

In order to control which transcoder is best for the given situation, we describe a content-network-device (CND) manager. The purpose of the CND manager is to select which transcoder to use. The selection is based on data obtained from content, network, user device characteristics.

Adaptable Bitstream Delivery System

Figure 3:
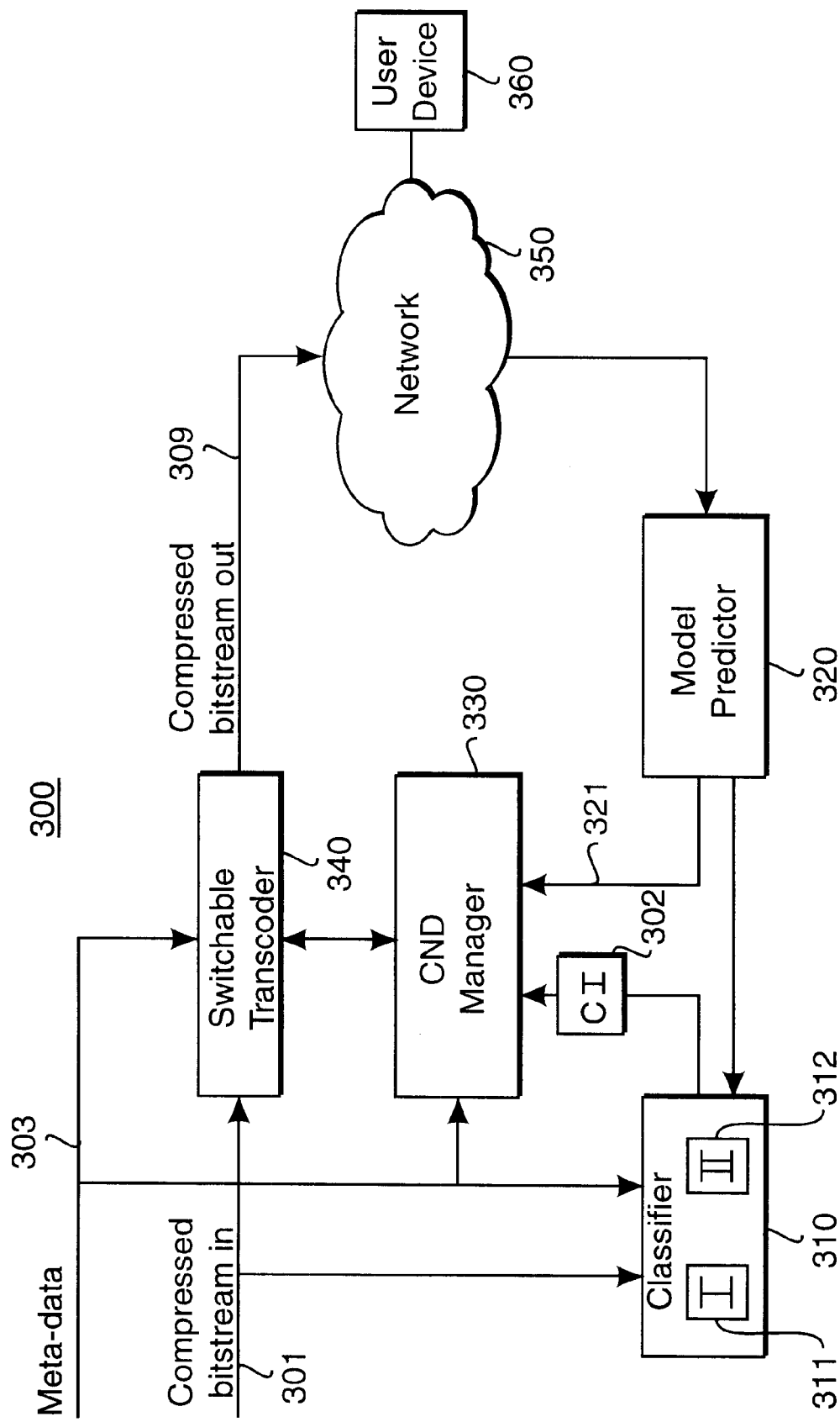
FIG. 3 is a block diagram of an adaptable bitstream delivery system.

As shown in FIG. 3, an adaptable bitstream delivery system 300 is composed of four major components: a content classifier 310, a model predictor 320, a content-network-device manager 330 and a switchable transcoder 340.

The goal of the system 300 is to deliver a compressed bitstream 301 with information content through a network 350 to a user device 360. The content of the bitstream can be visual, audio, textual, natural, synthetic, primitive, data, compound or combinations thereof. The network can be wireless, packet-switched, or other networks with unpredictable operational characteristic. The user device can be a video receiver, a stationary or mobile wireless receiver, or other like user devices with internal resource constraints that make quality reception of the bitstream difficult.

As an advantage, the system maintains the semantic fidelity of the content even when the bitstream needs to be further compressed to meet network and user device characteristics.

The input compressed bitstream is directed to the transcoder and the content classifier. The transcoder may ultimately reduce the rate of an output compressed bitstream 309 directed through the network at the user device.

The content classifier extracts content information (CI) 302 from the input bitstream for the manager. The main function of the content classifier is to map semantic features of content characteristics, such as activity, and video change information and texture, into a set of parameters that are used to make rate-quality trade-offs in the content-network manager. To assist with this mapping function, the content classifier can also accept meta-data information 303. Examples of meta-data include descriptors and description schemes that are specified by the emerging MPEG-7 standard.

In this architecture, the model predictor 320 provides feedback 321 regarding the dynamics of the network 350, and possible constraining characteristics of the user device 360. For example, the predictor reports network congestion and available bit rate (ABR). The predictor also receives and translates feedback on packet loss ratios within the network.

The predictor estimates a current network state, and long-term network predictions 321. Characteristically, the user device may have limited resources. For example, processing power, memory, and display constraints. For example, if the user device is a cellular telephone, the display can be constrained to textual information or low resolution images, or even worse, only audio. These characteristics can also impact the selection of a transcoding modality.

In addition to receiving the meta-data 303, the manager 330 also receives input from both the content classifier and the model predictor. The CND combines these two sources of information together so that an optimal transcoding strategy is determined for the switchable transcoder 340.

Content Classifier

In the field of pattern analysis and recognition, classification can be achieved by decomposing the bitstream into a set of features. The features themselves may be extracted using sophisticated transforms or simple local operators. Regardless of how the features are extracted, given a feature space of dimension N, each pattern can be represented as a point in this feature space.

It is customary to subject a variety of different training patterns as input to this extraction process and to plot the outcomes in the feature space. Provided that the feature set and training patterns are appropriate, we observe several clusters of points called "classes." These classes allow us to distinguish different patterns and group similar patterns, and to determine boundaries between the observed classes. Usually, the boundaries between classes adhere to some cost for misclassification and attempt to minimize the overall error.

After appropriate classes have been identified and suitable boundaries between the classes have been drawn, we can quickly classify new patterns in the bitstream. Depending on the problem, this can be accomplished with a neural network or other known classification techniques such as Support Vector Machines, see Cristianini et al. in "An Introduction to Support Vector Machines, (and other kernel-based learning methods)," Cambridge University Press, 2000.

The content classifier operates in two stage (I and II). First, we classify the bitstream content so that higher-level semantics can be inferred, and second, we adapt the classified content to network and user device characteristics.

In the first stage (I) 311, we extract a number of low-level features from the compressed bitstream using conventional techniques, for example, motion and texture. We can also access the meta-data 303, such as MPEG-7 descriptors and description schemes. If the meta-data are available, then less work needs to be performed on the compressed bitstream. As a final outcome of this first stage, a pre-determined set of content features are mapped to a finite set of semantic classes. Furthermore, within each semantic class, we differentiate based on the coding complexity, i.e., the complexity is conditional on the semantic class and network characteristics, and possibly device characteristics. This high-level understanding of the content is passed onto the CND manager 330 as content information (CI) 302. The CI 302, in part, characterizes the potential performance of this embodiment of the switchable transcoder.

The above classification is useful in terms of content understanding, and, ultimately discrete-summary transcoding, but it is also useful as an intermediate stage result. Essentially, we have a new set of classes that serve as input to the second stage II 312 of classification. In the second stage of classification, we map our semantic classes to features of network and device characteristics. These features will help us to determine the characteristics of rate-quality functions that assist the system in developing a transcoding strategy. In other words, if it is probable that a certain semantic class is characterized by bursty data due to object movement or video changes, then this should be accounted for when estimating how much resources the network should provide.

Content-Network-Device Manager

Figure 4:
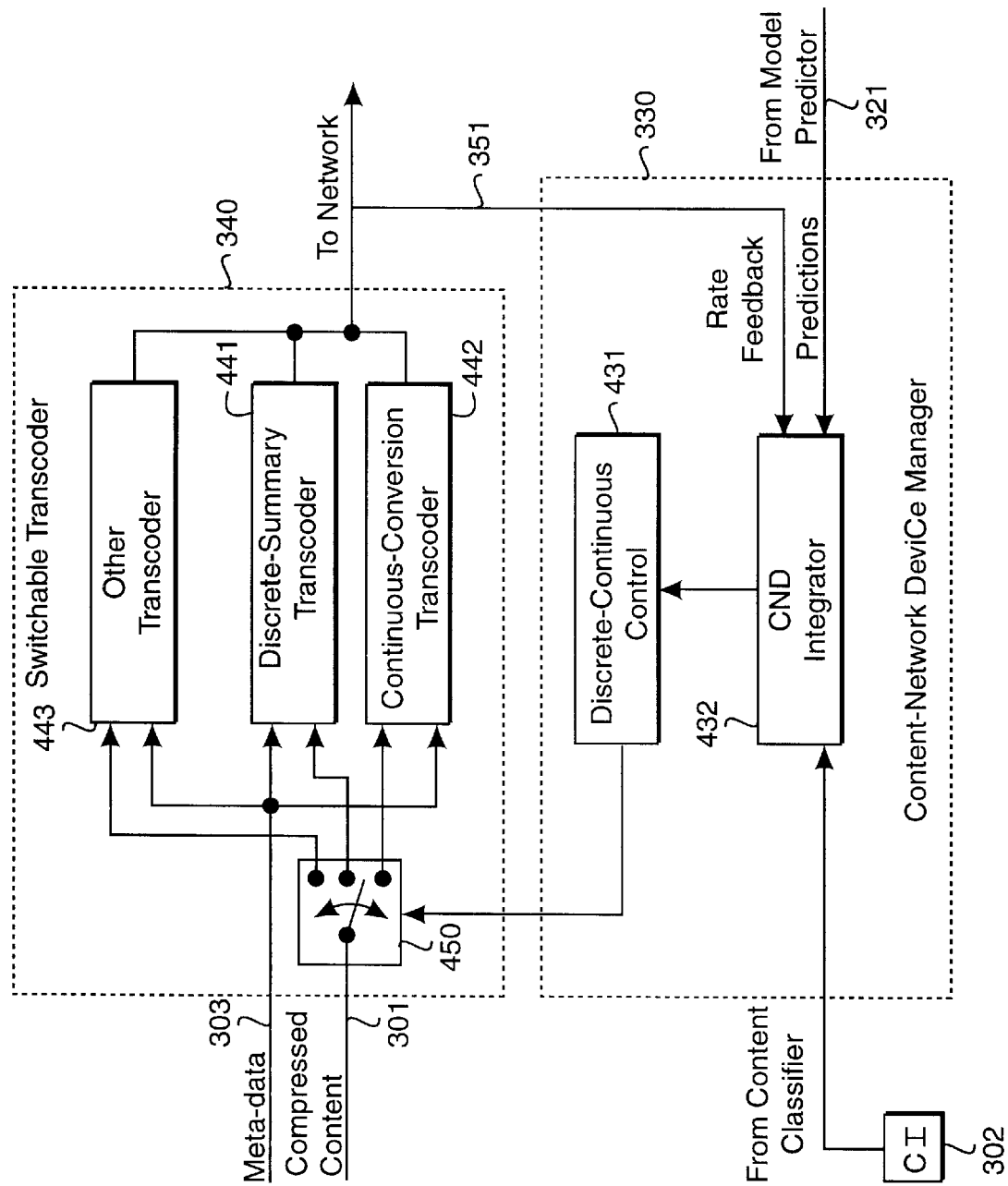
FIG. 4 is a block diagram of an adaptable transcoder and transcoder manager.

The content-network-device (CND) manager 330 and transcoder 340 are shown in greater detail in FIG. 4. The CND manager includes a discrete-continuous control 431 and a content-network-device (CND) integrator 432. The transcoder 340 includes a plurality of transcoders 441–443.

Using a switch 450, the control 431 is responsible for deciding how the input compressed bitstream 301 should be transcoded, e.g., with the discrete summary transcoder 441, the continuous conversion transcoder, 442, or some other transcoder 443. The network-content manager also dynamically adapts a target rate for the transcoder and considers resource constraining characteristics of the network and user device. These two very important items are decided by the control 431.

Figure 5:
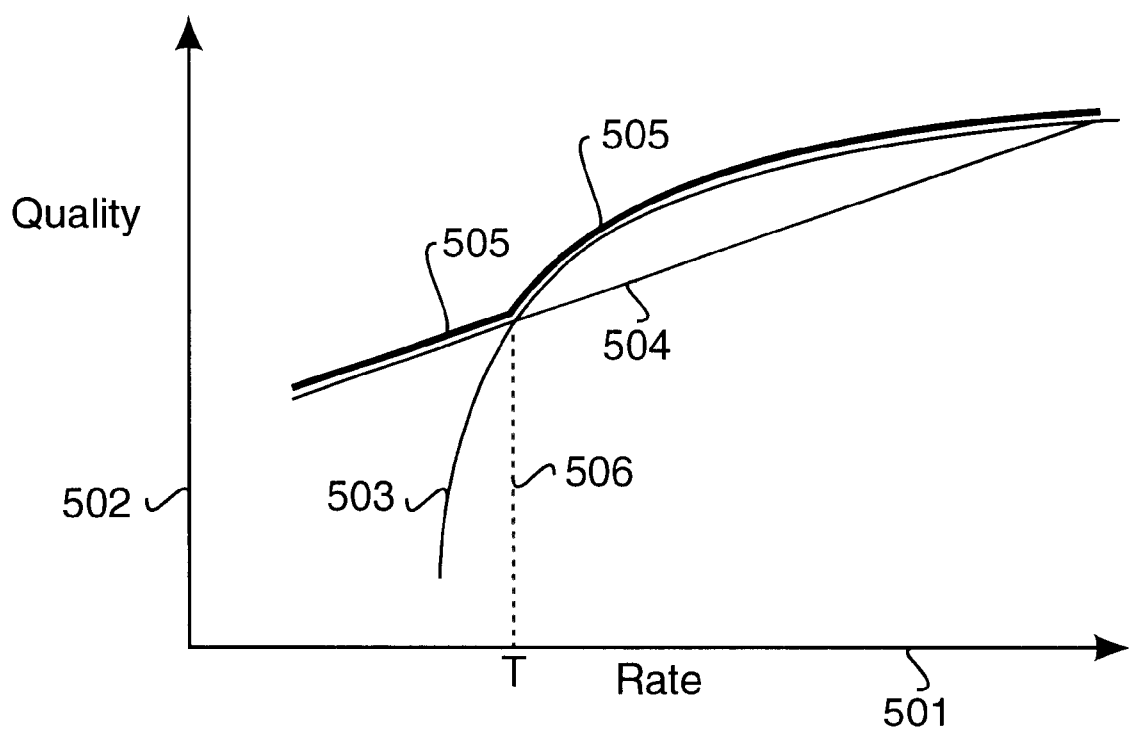
FIG. 5 is a graph of transcoding functions that can be used by the transcoder and manager of FIG. 4.

To better understand how the control makes optimal selection decisions, FIG. 5 graphs a plurality of rate-quality functions on rate 501 and quality 502 scales. One rate-quality function of the continuous-conversion transcoder 442 is shown by a convex function 503. The rate-quality curve for the discrete-summary transcoder 441 is represented by a linear function 504. Other transcoders may have different functions not shown.

It should be noted that these curves are only drawn for illustrative purposes. The true forms of the functions for a particular transcoder can vary depending on the content, how the content has been classified and possibly the current state of the network and device constraining characteristics. Obviously, at low bit rates the continuous-conversion transcoder degrades rapidly in quality, for reasons stated above. The optimal quality function 505 is shown in bold. This function best models the optimal quality that can be achieved for a given bit rate and user device.

We note there is a crossover in transcoding technique at a rate=T 506. For rates greater than T, it is best to use the continuous-conversion transcoder, and for rates less than T, it is best to use the discrete-summary transcoder. Of course the cross-over point will vary dynamically as content and network characteristics vary.

As mentioned above, continuous-conversion transcoders usually assume classic distortion metrics, such as PSNR. Because such measures do not apply to our discrete-summary transcoder, it makes more sense to map the classic distortion metrics to a measure of "fidelity." Fidelity measures how well the content is semantically summarized, and not the quantitative bit-by-bit difference. Given the same quality metric, we avoid any inconsistency in deciding the optimal transcoding strategy.

Content-Network-Device Integrator

Referring back to FIG. 4, the CND integrator 432 is the part of the CND manager that combines together content information 302 from the content classifier 310 and network-device predictions 321 from the model predictor. It is this part of the manager that generates the model expressed as the rate-quality functions shown in FIG. 5, or other like optimization functions. To form the optimal operating model, the CND integrator, examines the mappings CI from the content classifier and bit rate feedback 351 that is output from the switchable transcoder 340. Using this information, the integrator chooses the optimal modeling function 505 that has certain model parameters. The rate feedback 351 is used to dynamically refine the parameters. If the integrator finds that the chosen model is not optimal, then the integrator may decide to dynamically switch rate-quality functions. Also, the integrator may track several functions for different objects or different bitstreams and consider the functions either separately or jointly.

Impact of Network Predictions

The network predictions 321 may affect these characteristic functions by modulating certain portions of the optimal curve 505 one way or another. For instance, when higher bit rates are available, one still needs to be most careful. The network model may allow us to expend a high number of bits at a particular time instant, but long-term effects tell us that congestion is likely to build quickly. Therefore, our system may choose to hold back and continue to operate at a lower rate. Thus, we avoid problems related to a sudden drop in the available bit rate. These types of characteristics can be accounted for by modulating the curves of our transcoder.

Impact of Device Constraints

Device characteristics need to be considered also. Mobile devices have different operating characteristics than stationary devices. For example, Doppler spread can degrade performance at higher available bit rates. Thus, a lower bit rate should be selected. The device may have limited processing, storage and display capabilities that can impact the transcoder. For example, there is no point in delivering a video to an audio only device. In fact, the switchable transcoder can include another transcoder 443 that converts speech to text, or data to speech, etc. The important point is that the present switchable transcoder takes the semantics of the bitstream content and the destination device into consideration. Most prior art transcoders just consider the available bit rate.

Frame-Based Transcoder

The details of implementing frame-based transcoders are known in the prior art. For example, see any of the following U.S. Pat. No. : 5,991,716—Transcoder with prevention of tandem coding of speech; U.S. Pat. No. 5,940,130—Video transcoder with by-pass transfer of extracted motion compensation data; U.S. Pat. No. 5,768,278—N: 1 Transcoder; —U.S. Pat. No. 5,764,298 Digital data transcoder with relaxed internal decoder/coder interface frame jitter requirements; —U.S. Pat. No. 5,526,397—Switching transcoder; U.S. Pat. No. 5,334,977—ADPCM transcoder wherein different bit numbers are used in code conversion, or other like patents. None of these describe our technique for selecting a particular transcoding strategy depending on the semantic content of the bitstream and network characteristics. Below, we will also describe an object-based bitstream transcoder that could be selected.

The emphasis of this embodiment is to enable dynamic selection of a transcoding strategy that gives the best delivery of the semantic content of the bitstream, and not how the actual transcoding is performed.

So far we have described the different types of trade-offs that can be made by a switchable transcoder, including a continuous-conversion transcoder and a discrete-summary transcoder. In each of these transcoders, an optimal rate-quality curve was assumed.

Object-Based Transcoding

We now describe how the rate-quality curve for continuous-conversion transcoders is derived and how suitable encoding parameters such as the QP and the amount of frame skip are determined. We also extend this work to the context of MPEG-4. We describe a framework that adaptively transcodes, or scales, objects in the video, or scene, based on available bit rate and complexity of each video object.

Our scheme is adaptive in that various techniques can be employed to reduce the rate depending on the ratio of incoming to outgoing rate. Because our goal is to provide the best overall quality for objects of varying complexity, the degradation of each object need not be the same. Note, here we parse objects, and not frames as described above.

The novelty of our system is that it is capable of transcoding multiple objects of varying complexity and size, but more important, our system is capable of making spatio-temporal trade-offs to optimize the overall quality of the video. We focus on object-based bitstreams due to the added flexibility. We also describe various means that are available to manipulate the quality of a particular object.

The main point worth noting is that the objects themselves need not be transcoded with equal quality. For example, the texture data of one object may be reduced, keeping intact its shape information, while the shape information of another object is reduced, keeping its texture information intact. Many other combinations can also be considered, including dropping frames. In a news clip, for example, it would be possible to reduce the frame rate along with the texture and shape bits for the background, while keeping the information associated with the foreground news reader intact.

Quality of a Bitstream for Object-Based Transcoding

As stated above, conventional frame-based transcoders may be able to reduce the bit rate sufficiently. However, the quality of the content may be severely degraded and the information that is conveyed in the reduced bit rate bitstream may be lost altogether. Conventionally, bitstream "quality" is measured as the bit-by-bit differences between the input and output bitstreams.

However, in object-based transcoding according to the invention, we are no longer constrained to manipulate the entire video. We transcode a bitstream that has been decomposed into meaningful video objects. We realize that the delivery of each object, along with the quality of each object, has a different overall impact on quality. Because our object-based scheme has this finer level of access, it becomes possible to reduce the level of spatio-temporal quality of one object without significantly impacting the quality of the entire stream. This is an entirely different strategy than the one used by conventional frame-based transcoders.

In contrast to conventional bitstream quality, which measures the bit-by-bit differences of the entire video without regard to content, we introduce the notion of "perceptual video quality." Perceptual video quality is related to the quality of objects in the video that convey the intended information. For instance, the background of a video may be completely lost without effecting the perceptual video quality of a foreground object.

Object-Based Transcoding Framework

Figure 6:
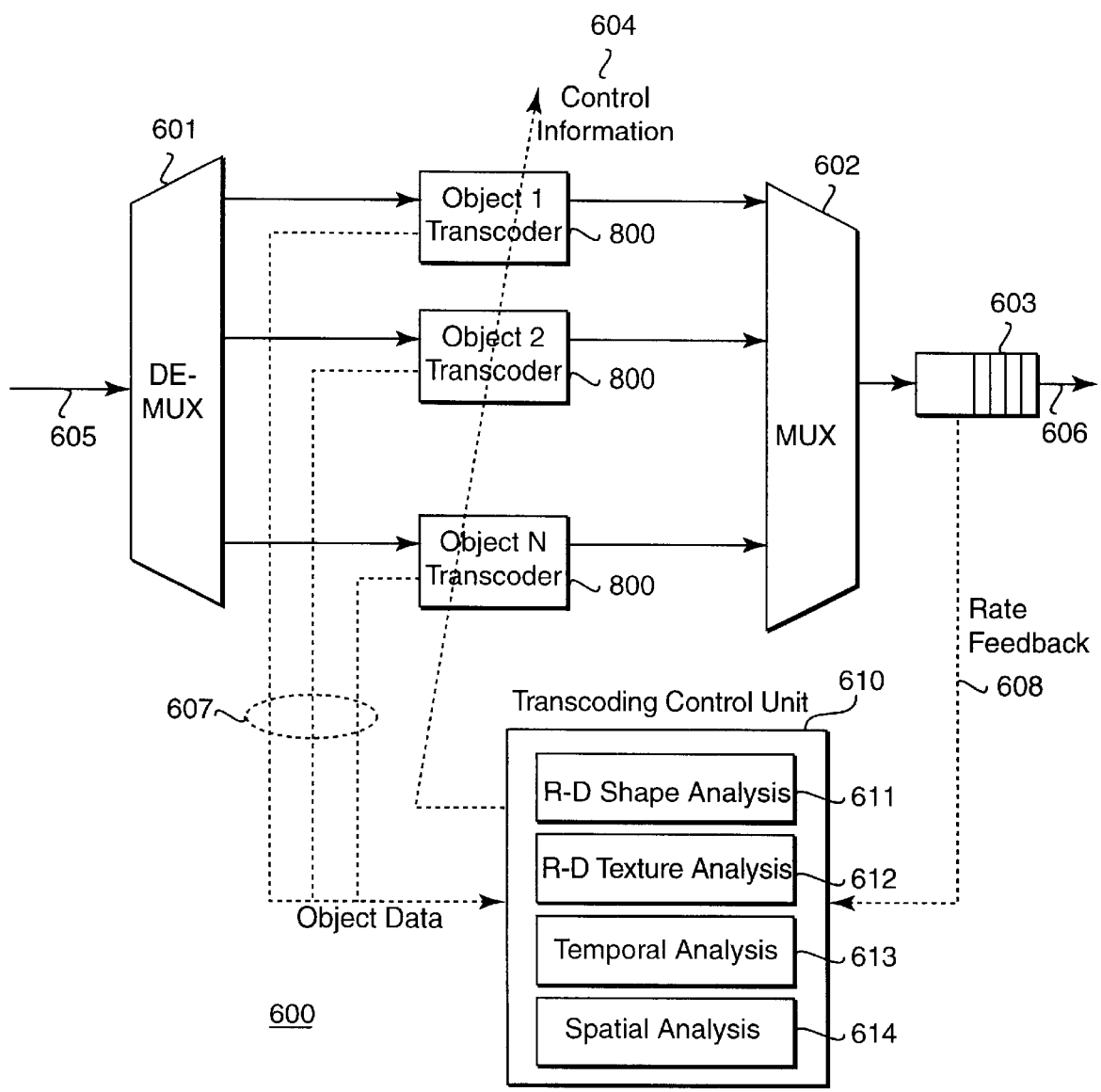
FIG. 6 is a block diagram of object-based bitstream scaling.

FIG. 6 shows a high-level block diagram of an object-based transcoder 600 according to an alternative embodiment of the invention. The transcoder 600 includes a demultiplexer 601, a multiplexer 602, and an output buffer 603. The transcoder 600 also includes one or more object-based transcoders 800 operated by a transcoding control unit (TCU) 610 according to control information 604. The unit 610 includes shape, texture, temporal, and spatial analyzers 611–614.

An input compressed bitstream 605 to the transcoder 600 includes one or more object-based elementary bitstreams. The object-based bitstreams can be serial or parallel. The total bit rate of the bitstream 605 is $R_{in}$. The output compressed bitstream 606 from the transcoder 600 has a total bit rate $R_{out}$ such that $R_{out} < R_{in}$.

The demultiplexer 601 provides one or more elementary bitstreams to each of the object-based transcoders 800, and the object-based transcoders 800 provide object data 607 to the TCU 610. The transcoders 800 scale the elementary bitstreams. The scaled bitstreams are composed by the multiplexer 602 before being passed on to the output buffer 603, and from there to a receiver. The buffer 603 also provides rate-feedback information 608 to the TCU.

As stated above, the control information 604 that is passed to each of the transcoders 800 is provided by the TCU. As indicated in FIG. 6, the TCU is responsible for the analysis of texture and shape data, as well as temporal and spatial resolution. All of these new degrees of freedom make the object-based transcoding framework very unique and desirable for network applications. As with the MPEG-2 and H.263 coding standards, MPEG-4 exploits the spatio-temporal redundancy of video using motion compensation and DCT. As a result, the core of our object-based transcoders 800 is an adaptation of MPEG-2 transcoders that have been described above. The major difference is that shape information is now contained within the bitstream, and with regard to texture coding, tools are provided to predict DC and AC for Intra blocks.

It is also important to note that the transcoding of texture is indeed dependent on the shape data. In other words, the shape data cannot simply be parsed out and ignored; the syntax of a compliant bitstream depends on the decoded shape data.

Obviously, our object-based input and output bitstreams 605–606 are entirely different than traditional frame-based video programs. Also, MPEG-2 does not permit dynamic frame skipping. There, the GOP structure and reference frames are usually fixed.

Texture Models

The use of texture models for rate control in an encoder has been extensively described in the prior art, see for example, "MPEG-4 rate control for multiple video objects," IEEE Trans. on Circuits and Systems for Video Technology, February 1999, by Vetro et al, and references therein.

In a texture model as used in our object-based transcoders 800, a variable R represents the texture bits spent for a video object (VO), a variable Q denote the quantization parameter QP, variables $(X_1, X_2)$ the first and second-order model parameters, and a variable S the encoding complexity, such as the mean absolute difference. The relation between R and Q is given by:

$$R = S \cdot \left(\frac{X_1}{Q} + \frac{X_2}{Q^2}\right)$$

Given the target amount of bits that are assigned to a VO, and the current value of S, the value of Q depends on the current value of $(X_1, X_2)$. After a VO has been encoded, the actual number of bits that are spent is known, and the model parameters can be updated. This can be done by linear regression using results from previous n frames.

Texture Analysis

The transcoding problem is different in that Q, the set of original QP's, and the actual number of bits are already given. Also, rather than computing the encoding complexity S from the spatial domain, we must define a new DCT-based complexity measure, $\tilde{S}$. This measure is defined as:

$$\tilde{S} = \frac{1}{M_C} \sum_{m \in M} \sum_{i=1}^{63} \rho(i) \cdot |B_m(i)|^2$$

where $B_m(i)$ are the AC coefficients of a block, m is a macroblock index in the set M of coded blocks, $M_C$ is the number of blocks in that set, and $\rho(i)$ is a frequency dependent weighting. The complexity measure indicates the energy of the AC coefficients, where the contribution of high frequency components is lessened by the weighting function. This weighting function can be chosen to mimic that of an MPEG quantization matrix.

From the data transmitted in the bitstream, and the data from past VO's, the model parameters can be determined, and continually updated. Actually, we can update the model twice for every transcoded VOP; once before transcoding using data in the bitstream, then again after coding the texture with the new set of QP's, Q'. With this increased number of data points, the model parameters are more robust and converge faster.

The main objective of our texture analysis is choosing Q' which satisfy the rate constraint while minimizing distortion. However, it is important to note that optimality is conditioned on Q. Therefore, we must take care in how the distortion is quantified. From this point on, we will refer to this distortion as a conditional distortion due to the dependence on Q.

One way to determine Q' is to utilize the same methodology as used in the rate control problem. This way, we first estimate a budget for all VOP's at a particular time instant, adjust the target to account for the current level of the buffer, then distribute this sum of bits to each object. Given these object-based target bit rates, the new set of QP's can be determined from our texture model. The main problem with this approach is that we rely on the distribution of bits to be robust. In general, the distribution is not robust and the ability to control our conditional distortion is lost because the new QP's have been computed independent of the original ones.

Conditional Distortion

To overcome this problem, and to attempt to solve for Q' in some way that is dependent on Q', we describe a method based on dynamic programming. To maintain as close a quality as possible to the original quality, the QP's of each object should change as little as possible. Given this, we can define a conditional distortion as:

$$D(\underline{Q}' \mid \underline{Q}) = \sum_{k \in K} a_k [D(Q'_k) - D(Q_k)]$$

where k denotes a VOP index in the set of VOPs, K, and $a_k$ represents the visual significance or priority of object k. Note, although D(Q) is not explicitly specified, we know that it is proportional to Q. The visual significance may be a function of the objects relative size and complexity.

QP Search Space

Figure 7:
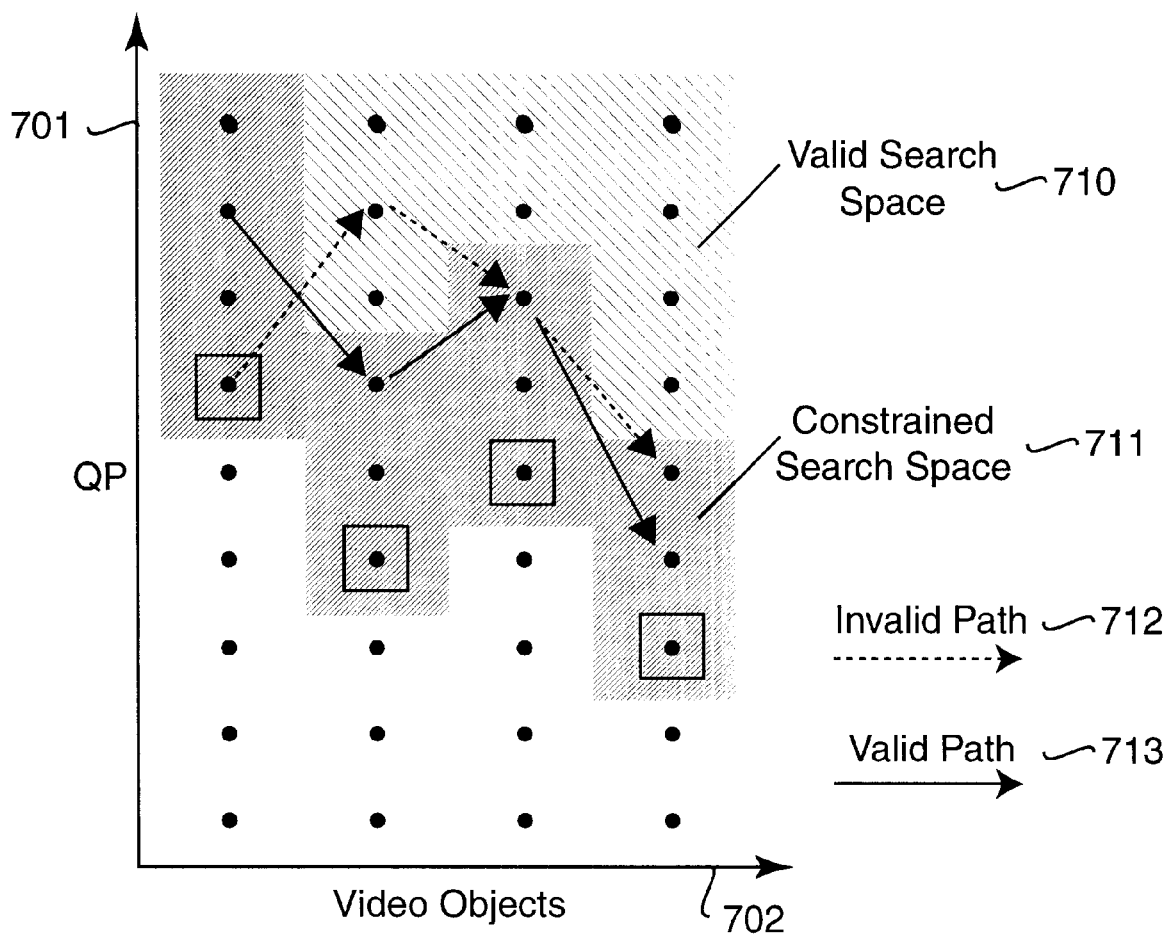
FIG. 7 is a graph of a search space.

It is important to note that $Q_k \geq Q_k$, for all k>. Therefore, the solution space is limited to a valid solution space shown in FIG. 7. In FIG. 7, the x-axis indicates video objects, 702, and the y-axis QP 701. The Figure also shows a valid search space 710, a constrained search space 711, a valid path 713, and an invalid path 712.

Given the above quantification for conditional distortion, we solve our problem by searching for the best path through the trellis of FIG. 7, where the valid QP's are nodes in the trellis, and each node is associated with an estimated rate and conditional distortion. Formally, the problem can be stated as:

$$\min D(Q'|Q) \text{ subject to } R_{TOTAL} \leq R_{BUDGET}$$

Converting the constrained problem into an unconstrained problem solves this problem, where the rate and distortion are merged through a Lagrangian multiplier, $\lambda$. For any $\lambda \geq 0$, the optimal solution can always be found. To determine the value of $\lambda$ that satisfies the constraint on the rate, the well-known bisection algorithm can be used, see Ramchandran and Vetterli, "Best wavelet packet bases in the rate-distortion sense," IEEE Trans. Image Processing, April 1993.

It is important to emphasize that the search space considered is much less than that found in MPEG-2 transcoding algorithms. There, an attempt is made to find the best set of quantizers for every macroblock. In contrast here, we only search for object-based quantizers. Hence, our approach is very practicable.

Temporal Analysis

Generally speaking, the purpose of skipping frames is to reduce the buffer occupancy level so that buffer overflow and ultimately the loss of packets is prevented. Another reason to skip frames is to allow a trade-off between spatial and temporal quality. In this way, fewer frames are coded, but they are coded with higher quality. Consequently, if the buffer is not in danger of overflowing, then the decision to skip a frame is incorporated into the QP selection process.

Building from the proposed technique for QP selection, which searches a valid solution space for a set of QP's, we achieve this spatial-temporal trade-off by constraining the solution space. As shown in FIG. 7, a valid path is one in which all elements of Q' fall in the constrained area. If one of these elements falls outside the area, then the path is invalid in that it is not maintaining some specified level of spatial quality. The spatial quality is implied by the conditional distortion.

Different criteria may be used to determine the maximum QP for a particular object. For example, the maximum value can be a function of the object complexity or simply a percentage of the incoming QP. In the case where the maximum is based on complexity, the transcoder essentially limits those objects with higher complexity to smaller QPs, because their impact on spatial quality would be most severe. On the other hand, limiting the complexity based on the incoming QP implies that the transcoder maintains a similar QP distribution as compared to the originally encoded bitstream. Both approaches are valid. Trade-offs to determine the best way to limit the QP for each object can depend on trade-offs between spatial and temporal quality.

Of course, one of the advantages in dealing with object-based data is that the temporal quality of one object can be different from another. In this way, skipping the background object, e.g., stationary walls, can save bits. However, because objects are often disjoint, reducing the temporal resolution of one object may cause holes in the composed video. This problem can be reduced by imposing the constraint that all VOP's have the same temporal resolution.

Shape Analysis

To introduce the problems with transcoding shape data of video objects, we recall how texture information is transcoded. It is well known that the rate for texture can be reduced by a partial decoding of the data. In most cases, this partial decoding requires at least the variable-length decoding (VLD) operation to be performed. The inverse quantization and inverse DCT can be omitted.

However, for shape data, this is not the case. In MPEG-4, the shape data are coded on a per block basis by the so-called context-based arithmetic encoding algorithm, see Brady, "MPEG-4 standardization methods for the compression of arbitrarily shaped objects," IEEE Trans Circuits and Systems for Video Technology, December 1999. With this algorithm, a context for each pixel is computed based on either a 9-bit or 10-bit causal template, depending on the chosen mode. This context is used to access a probability look-up table, such that the sequence of probabilities within a block drives an arithmetic encoder.

In contrast to the texture, partial decoding of the shape is not possible because there is no intermediate representation between the pixel domain and the bitstream. Therefore, in order to manipulate the resolution of the shape data, the data must be fully decoded. After decoding, models such as described in U.S. patent application Ser. No. 09/410,552 "Estimating Rate-Distortion Characteristics of Binary Shape Data," filed Oct. 1, 1999 by Vetro et al, can be used to evaluate the rate-distortion characteristics of the shape.

Spatial Analysis

Another means of reducing the rate is to reduce the resolution by sub-sampling. In version 2 of the MPEG-4 standard, a tool called Dynamic Resolution Conversion (DRC) has been adopted into the MPEG-4 standard. With this tool it is be possible to reduce the resolution, i.e., spatial quality, of one object, while maintaining the resolution of other more important or spatially active objects.

Architecture

Figure 8:
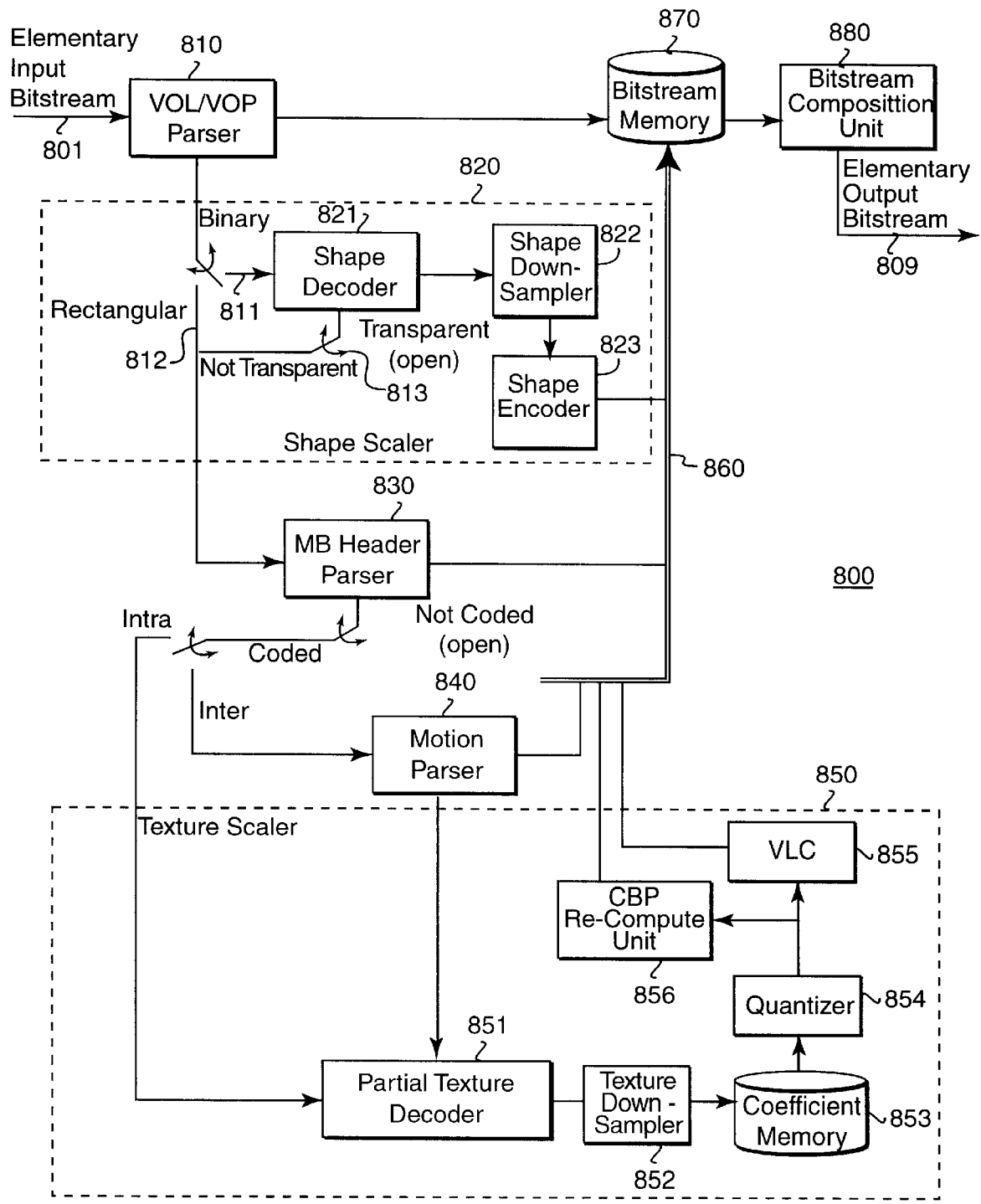
FIG. 8 is a block diagram of details of an object-based transcoder according to the invention.

FIG. 8 shows the components of an object-based transcoder 800 according to our invention. As with transcoding architectures in the prior art, the syntax of encoding standards somewhat dictates the architecture of the transcoder 800. We will now describe the major features of our transcoder in light of the MPEG-4 standard and contrast these features with traditional frame-based transcoding.

The transcoder 800 includes a VOL/VOP parser 810, a shape scaler 820, a MB header parser 830, a motion parser 840, and a texture scaler 850. The transcoder also includes a bus 860 that transfers various parts of the elementary bitstream 801 to a bitstream memory 870. From this global storage, the elementary bitstreams composition unit 880 can form a reduced rate compressed bitstream, compliant with the MPEG-4 standard. The output elementary bitstream 809 is fed to the multiplexer of FIG. 6.

In MPEG-4, the elementary bitstreams for each object are independent of other bitstreams. As a result, each object is associated with a video object layer (VOL) and video object plane (VOP) header. The VOP header contains the quantization parameter (QP) that was used to encode the object. The QP for each object is later used in the modeling and analysis of the texture information. All other bits are stored in the bitstream memory 870 until it is time to compose the outgoing bitstream 606 of FIG. 6.

The most significant difference from other standards is that MPEG-4 is capable of coding the shape of an object. From the VOP layer, we find out whether the VOP contains shape information (binary) or not (rectangular) 812. If it is a rectangular VOP, then the object is simply a rectangular frame and there is no need to parse shape bits. In the case of binary shape, we need to determine 813 if the macroblock is transparent or not. Transparent blocks are within the bounding box of the object, but are outside the object boundary, so there is no motion or texture information associated with it.

The shape scaler 820 is comprised of three sub-components: a shape decoder/parser 821, a shape downsampler 822, and a shape encoder 823. If the shape information of the bitstream is not being scaled, then the shape decoder/parser is simply a shape parser. This is indicated by the control information 604 received from the R-D shape analysis 611 of the transcoder control unit 610. Also, in this case, the shape down-sampler 822 and shape encoder 823 are disabled. When shape information is being scaled, the shape decoder/parser 821 must first decode the shape information to its pixel domain representation. To reduce the rate for shape, a block may be down-sampled by a factor of two or four using the shape down-sampler 822, then re-encoded using shape encoder 823. The ratio of conversion is determined by the R-D shape analysis 611. Whether the shape bits have simply been parsed or scaled, the output of the shape scaler 820 is transferred to the bitstream memory 870 via the bitstream bus 860.

Other than the shape bits, the remainder of the MPEG-4 syntax is somewhat similar to that of MPEG-2 with a few exceptions. At the macroblock (MB) layer, there exist bits that contain the coded block pattern (CBP). The CBP is used to signal the decoder which blocks of a macroblock contain at least one AC coefficient. Not only does the CBP affect the structure of the bitstream, but the CBP also has an impact on Intra AC/DC prediction. The reason that the transcoder must be concerned with this parameter is because the CBP will change according to the re-quantization of DCT blocks. For this reason, we re-compute the CBP after the blocks have been re-quantized; this is accomplished by a CBP re-compute unit 856 of the texture scaler. The unit 856 sends a variable length code (VLC) 855 to the bitstream memory 870 via the bitstream bus 860 to replace the header that was present in the input bitstream.

After we have parsed the elementary bitstream to extract the relevant decoding parameters, we proceed to partially decode the texture blocks 851. The result of this process are the DCT block coefficients. If the spatial (re-size) analysis is enabled, the object may be down-sampled by a factor of two or four. The ability to down-sample blocks is indicated by the transcoding control unit 610, and the down-sampling factor by the spatial analysis 614. Furthermore, this down-sampling is performed in the DCT domain so that the IDCT/DCT operations can be avoided, see U.S. Pat. No. 5,855,151, "Method and apparatus for down-converting a digital signal," issued on Nov. 10, 1998 to Bao et al. The DCT blocks are then stored temporarily in a coefficient memory 853. From this memory, blocks are sent to quantizer 854, which quantizes the blocks according to the QP sent from the R-D texture analysis 612, which uses the techniques described in this invention to meet the new target rate.

To skip objects, the temporal analysis 613 indicates to the bitstream composition unit 880 which bits are to be composed and sent out, and which bits should be dropped. In this way, parts of the bitstream that may have been written into this memory will simply be overwritten by data of a next video object.

Implementation & Processing

Regarding a specific embodiment, it should be noted that the architecture of transcoder 800 illustrates the components for a single object. In the extreme case, multiple-objects may be scaled with multiple transcoders as shown in FIG. 6. In a software implementation that considers multi-thread execution, this may be the most efficient way. The challenge in a software implementation is to allocated appropriate amounts of CPU processing to each object under consideration.

However, for hardware implementations, the case is very different. Hardware designers usually prefer to have one piece of logic that handles a specific functionality. For example, rather than implementing M motion parsers for a maximum number of M objects that may be received, the hardware design would include a single motion parser that operates at a certain speed so that multiple objects can be parsed at a given time instant. Of course, if the number of objects exceeds the parser's throughput, parallel parsers can still be used. The main point is that the number of parsers required can be less than the than the total objects that are received, and computation is distributed among the parallel parsers. This notion applies to all sub-blocks of the transcoder 800.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. An apparatus for converting a compressed bitstream, comprising:
    a demultiplexer to extract each of a plurality of video objects from a compressed input bitstream as an elementary input bitstream having a first bit rate;
    a transcoder to convert each elementary input bitstream to an elementary output bitstream having a second bit rate;
    a transcoding control unit, coupled to the transcoder, to generate control information for the transcoder; and
    a multiplexer configured to compose the elementary output bitstreams into a compressed output bitstream having the second bit rate.

2. The apparatus of claim 1 wherein the second bit rate is less than the first bit rate.

3. The apparatus of claim 1 further comprising:
    an output buffer, coupled to the multiplexer, to generate rate feedback information for the transcoding control unit.

4. The apparatus of claim 1 wherein the transcoder converts multiple elementary bit streams in parallel.

5. The apparatus of claim 1 wherein the transcoding control unit further comprises a shape analyzer, a texture analyzer, a temporal analyzer, and a spatial analyzer to generate the control information from object data generated by the transcoder.

6. The apparatus of claim 5 wherein the texture analyzer uses a texture model $$R = S \cdot \left( \frac{X_1}{Q} + \frac{X_2}{Q^2} \right)$$

where R represents a number of texture bits spent for a particular video object (VO), Q represents a quantization parameter QP, $X_1$ and $X_2$ represent the first and second-order model parameters, and S represent a encoding complexity.

7. The apparatus of claim 6 wherein the texture model is updated by linear regression using results from previous n frames.

8. The apparatus of claim 6 wherein the encoding complexity S is defined by a discrete cosine transform-based complexity measure $\tilde{S}$:

$$\tilde{S} = \frac{1}{M_C} \sum_{m \in M} \sum_{i=1}^{63} \rho(i) \cdot |B_m(i)|^2$$

where $B_m(i)$ are AC coefficients of a block, m is a block index in a set M of coded blocks, $M_C$ is the number of blocks in the set M, and $\rho(i)$ is a frequency dependent weighting.

9. The apparatus of claim 6 wherein the texture model is updated before and after converting a particular video object.

10. The apparatus of claim 1 wherein a first temporal quality of a first video object at a given instant in time is different than a second temporal quality of a second video object at the given instant in time.

11. The apparatus of claim 1 wherein a first spatial quality of a first video object at a given instant in time is different than a second spatial quality of a second video object at the given instant in time.

12. The apparatus of claim 1 wherein each elementary bitstream is converted independent of other elementary bitstreams.

13. The apparatus of claim 1 wherein the transcoder further comprises:

a video object layer/video object plane parser, a shape scaler, a header parser, a motion parser, a texture scaler, a bitstream memory connected to each other by a bitstream bus.

14. The apparatus of claim 1 wherein the video object layer/video object plane parser determines whether a particular video object includes shape information.

15. The apparatus of claim 13 wherein the shape scaler further comprises:

a shape decoder/parser, a shape down-sampler, and a shape encoder serially connected to each other.

16. The apparatus of claim 15 wherein shape information of the video objects is converted by the down-sampler.

17. The apparatus of claim 13 wherein the texture scaler further comprises:

a partial texture decoder, a texture down-sampler, a coded bit pattern re-compute unit, a coefficient memory, and a quantizer to generate a variable length code for the bitstream memory.

18. The apparatus of claim 17 wherein a previous variable bit length code in a header of a particular elementary bitstream is replaced by the variable bit length code generated by the texture scaler.

19. The apparatus of claim 17 wherein the texture down-sampler operates in a discrete cosine transform domain.

20. The apparatus of claim 5 wherein the transcoder includes a texture scaler including a quantizer to quantize the video objects according to a quantization parameter generated by the texture analyzer.

21. A method for converting a compressed bitstream, comprising the steps of:

extracting each of a plurality of video objects as an elementary input bitstream having a first bit rate from a compressed input bitstream;

converting each elementary input bitstream to an elementary output bitstream having a second bit rate;

generating control information for the converting; and composing the elementary output bitstreams into a compressed output bitstream having the second bit rate.

22. The method of claim 21 wherein the second bit rate is less than the first bit rate.

23. The method of claim 1 further comprising the steps of:

generating rate feedback from an output buffer.

24. The method of claim 1 wherein the control information is generated by analyzing shape, texture, time, and space data of the video objects.

25. The method of claim 24 wherein the texture analyzing uses a texture model $$R = S \cdot \left( \frac{X_1}{Q} + \frac{X_2}{Q^2} \right)$$

where R represents a number of texture bits spent for a particular video object (VO), Q represents a quantization parameter QP, $X_1$ and $X_2$ represent the first and second-order model parameters, and S represents an encoding complexity.

26. The method of claim 25 wherein the texture model is updated by linear regression using results from previous n frames.

27. The method of claim 25 wherein the encoding complexity S is defined by a discrete cosine transform-based complexity measure $\tilde{S}$:

$$\tilde{S} = \frac{1}{M_C} \sum_{m \in M} \sum_{i=1}^{63} \rho(i) \cdot |B_m(i)|^2$$

where $B_m(i)$ are AC coefficients of a block, m is a block index in a set M of coded blocks, $M_C$ is the number of blocks in the set M, and $\rho(i)$ is a frequency dependent weighting.

28. The method of claim 25 wherein the texture model is updated before and after converting a particular video object.

29. The method of claim 21 wherein a first temporal quality of a first video object at a given instant in time is different than a second temporal quality of a second video object at the given instant in time.

30. The method of claim 21 wherein a first spatial quality of a first video object at a given instant in time is different than a second spatial quality of a second video object at the given instant in time.

31. The method of claim 21 wherein multiple elementary bitstreams are converted in parallel.

* * * * *